(12) United States Patent
Uehara et al.

(10) Patent No.: US 9,583,911 B2
(45) Date of Patent: Feb. 28, 2017

(54) OPTICAL AMPLIFIER

(71) Applicant: SEI Optifrontier Co., Ltd., Yokohama-shi, Kanagawa (JP)

(72) Inventors: Fumiya Uehara, Kanagawa (JP); Toshiyuki Miyamoto, Kanagawa (JP); Tetsufumi Tsuzaki, Kanagawa (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/054,167

(22) Filed: Feb. 26, 2016

(65) Prior Publication Data

US 2016/0261087 A1  Sep. 8, 2016

(30) Foreign Application Priority Data

Mar. 2, 2015  (JP) ................. 2015-039928

(51) Int. Cl.
| | |
|---|---|
| *H01S 3/13* | (2006.01) |
| *H01S 3/09* | (2006.01) |
| *H04B 10/29* | (2013.01) |
| *H04B 10/293* | (2013.01) |
| *H01S 3/091* | (2006.01) |
| *H01S 3/131* | (2006.01) |
| *H04B 10/25* | (2013.01) |

(52) U.S. Cl.
CPC .......... *H01S 3/1305* (2013.01); *H01S 3/0912* (2013.01); *H01S 3/1306* (2013.01); *H01S 3/1312* (2013.01); *H04B 10/2931* (2013.01)

(58) Field of Classification Search
CPC .... H01S 3/1305; H01S 3/0912; H01S 3/1306; H01S 3/1312; H04B 10/293; H04B 10/2931
See application file for complete search history.

(56) References Cited

FOREIGN PATENT DOCUMENTS

JP  2009238792 A  * 10/2009

OTHER PUBLICATIONS

Shoichi Sudo, "Erbium-Doped Fiber Amplifier," Optronics Co., Ltd., Apr. 20, 2001, pp. 96-98, including partial English translation.

* cited by examiner

*Primary Examiner* — Eric Bolda
(74) *Attorney, Agent, or Firm* — Drinker Biddle & Reath LLP

(57) ABSTRACT

The present embodiment relates to an optical amplifier which can perform an amplification operation equivalent to a normal operation even with an increase of dark current in a PD forming a part of a light detection circuit for monitoring signal light as an amplification object. In the optical amplifier, a detection controller performs an anomaly determination on a light detection circuit due to an increase of dark current in the PD based on a difference between temporal change amounts of a signal component of a voltage of output signal from a light receiving unit including the PD, and a voltage component in a high frequency region included in the signal component. An amplification controller can perform suitable switching of control on a drive current to a pumping light source, based on the result of the determination.

9 Claims, 11 Drawing Sheets

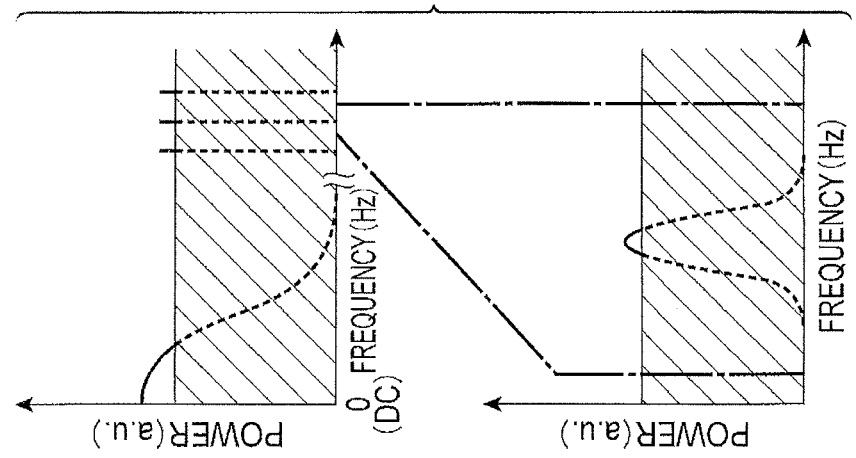
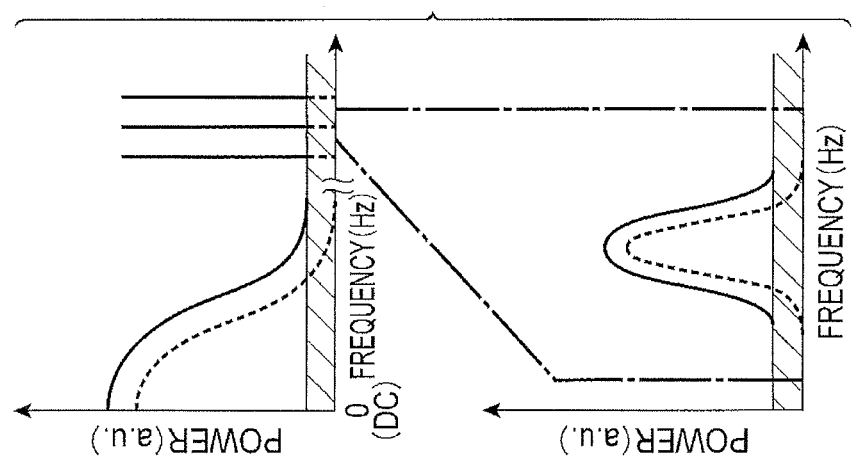
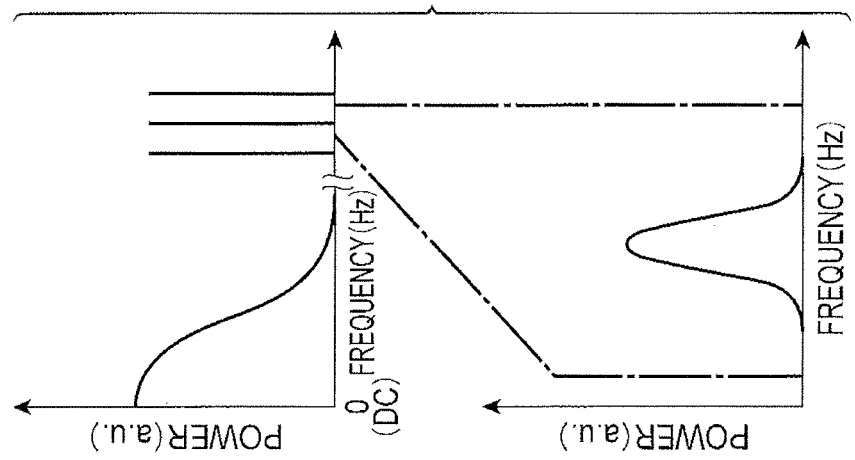

OPTICAL AMPLIFIER

TECHNICAL FIELD

The present invention relates to an optical amplifier including an optical fiber as an amplifying medium.

BACKGROUND

Since long-haul transmission in optical communication suffers reduction of signal light power due to a loss during propagation through a transmission line, the optical signal needs to be amplified by a repeater, so as to compensate for the loss. Optical amplifiers are known as devices to be used for this repeater.

Examples of the optical amplifiers include optical fiber amplifiers which use a rare-earth doped optical fiber as an amplifying medium, semiconductor optical amplifiers which use a semiconductor as an amplifying medium, Raman amplifiers which make use of stimulated Raman scattering of optical fiber, and so on.

In general, for controlling the optical output power of the optical amplifier or the gain in the optical amplifier, it is necessary to monitor each of output-signal-light power (signal light power after amplification) and input-signal-light power (signal light power before amplification). Various light power detection circuits to monitor the signal light power allocated in the optical amplifier are also used for detecting reduction of signal light power and increase of the reflected signal light power due to disconnection of optical fiber cord, and other abnormal conditions.

For example, Shouichi SUDO, "Erbium-Doped Fiber Amplifiers," (2nd impression of 1st edition), The Optronics Co., Ltd., pp. 96-98, Apr. 20, 2001 (Non Patent Literature 1) describes the fundamental configuration of an Erbium-doped (Er-Doped) fiber amplifier (EDFA) which is a type of optical amplifier. Specifically, the EDFA is composed of an Er-doped optical fiber (EDF) as a gain medium for the amplification, a pumping light source which supplies pumping light for pumping of the EDF, a WDM coupler which multiplexes the pumping light and signal light, and an optical isolator which prevents the EDF from oscillating due to the counter propagated lights to the EDF.

For performing a control to keep the gain (constant gain keeping control) in the EDFA as described above, partial lights of the input signal light and output signal light branched by tap couplers are converted into electric signals by respective photodiodes (each of which will be represented hereinafter by PD) and the result of a comparison between the obtained electric signals is fed back to a control of the drive current of the pumping light source. For performing a control to keep the output signal power (constant output signal power keeping control) in the EDFA as described above, partial light of the output signal light branched by a tap coupler is successively converted into electric signals by a PD, and the result of a comparison between successively-obtained electric signals is fed back to the control of the drive current to the pumping light source. PD is a photoelectric conversion element which converts an optical signal power into by receiving optical signals at the PD surface thereof and thus is considered to be an electric current source on an electric circuit. For this reason, for using a voltage signal according to a quantity of received light, it is necessary to use a current-voltage conversion circuit. The simplest example of the current-voltage conversion circuit is parallel connection of a PD and a resistor, which can obtain a voltage signal according to a quantity of received light.

SUMMARY

The inventors conducted research on the conventional optical amplifiers and found the problems as described below. Specifically, the optical amplifier is generally configured with use of various light detection circuits to monitor the optical light power allocated in the optical amplifier, for controlling the light quantity of the signal light after amplification (amplified signal light) or the gain of amplifier, and for detecting disconnection of optical fiber cord or other abnormal conditions. Such light detection circuits are configured using the PD for converting a partial light of the signal light to be monitored, into an electric signal, and an increase of dark current in the PD causes as an increase in output voltage from the light detection circuit (apparent increase of received light power), which causes a malfunction in the control of the drive current to the pumping light source.

Namely, the conventional optical amplifiers do not allow us to determine whether an increase in output voltage from the signal light detection circuit is caused by an increase of the signal light or by an increase of dark current in the PD and, for this reason, it has been difficult heretofore to avoid the malfunction in the control of the drive current to the pumping light source, which is caused by a failure of the light detection circuit (a failure of the PD).

Since the increase in dark current in the PD caused for some reason leads to the apparent increase in quantity of received signal light in the PD as described above, the signal light detection circuit disposed in the optical amplifier is considered to go into any of below-described situations, in use of the constant light output keeping control or the constant gain keeping control.

For example, with an increase of dark current of the PD in an amplified signal light detection circuit to monitor the amplified signal light (or with an apparent increase in quantity of received light which is the amplified signal light), the output voltage from the amplified signal light detection circuit also increases. Since a circuit anomaly in the amplified signal light detection circuit itself (the increase in dark current in the PD) cannot be detected in the conventional optical amplifiers, it is determined that the amplification gain appears to increase, in the drive current control for the pumping light source. In this case, the drive current control functions to lower the pumping light drive current, resulting in decrease in actual signal light power of optical amplifier.

With an increase of dark current in the PD in an input signal light detection circuit to monitor the signal light before amplification (input signal light) (or with an apparent increase of received signal light which is the input signal light), the output voltage from the input signal light detection circuit also increases. In the operation of monitoring the input signal light, it is common practice to set a threshold for reduction in light quantity of the input signal light, to detect an anomaly (disconnection or the like). For this reason, the input signal light detection circuit is incapable of detecting the increase in dark current in the PD as an anomaly.

In a reflected signal light detection circuit to monitor the signal light reflected downstream of the optical amplifier (reflected signal light), when there is an increase of dark current in the PD (or an apparent increase in quantity of received light which is the reflected signal light), the increase in dark current is detected as an anomaly because a threshold is set for this increase of the reflected signal light, so as to detect the anomaly (disconnection or the like other abnormal conditions). However, an ordinary anomaly process may be configured with measures to forcibly shut down the operation of the optical amplifier with occurrence of downstream disconnection, and this may cause the operation of the optical amplifier to also be forcibly shut down with the increase of dark current in the PD.

The present invention has been accomplished to solve the previously described problems and it is an object of the present invention to provide an optical amplifier with a structure for enabling detection of an increase of dark current in a photoelectric conversion element for receiving a partial light of signal light, which constitutes a part of various light detection circuits for monitoring the signal light as an amplification object.

For solving the aforementioned problems, an optical amplifier according to an embodiment of the invention comprises: an input terminal where signal light enters; an output terminal where the signal light is output voltage; a transmission line which is arranged between the input terminal and the output terminal and on which the signal light propagates; an optical amplification device arranged on the transmission line; an amplification controller for controlling at least the optical amplification device; and a light detection circuit arranged in at least either one of a section on the transmission line between the input terminal and the optical amplification device and a section on the transmission line between the optical amplification device and the output terminal. The optical amplification device has an amplification transmission medium for amplifying the signal light and a pumping light source for supplying pumping light to the amplification transmission medium, and the amplification controller controls at least the pumping light source. Particularly, the light detection circuit has a light splitting unit, a light receiving unit, an extraction unit, a signal component detection unit, a high frequency component detection unit, and a detection controller, for enabling a determination of an anomaly in the light detection circuit due to an increase of dark current in a photoelectric conversion element such as a PD, using a high frequency component of modified signal light. The light splitting unit extracts a partial light of the signal light as split light from the transmission line. The light receiving unit includes a photoelectric conversion element and outputs a voltage signal according to a light quantity of the split light received by the photoelectric conversion element. The extraction unit extracts a voltage component in a high frequency region included in a voltage component of the signal light, from the output voltage from the light receiving unit. The signal component detection unit detects the output voltage from the light receiving unit. The high frequency component detection unit detects a voltage signal output voltage from the extraction unit. The detection controller detects, at least, whether there is an increase of dark current in the light receiving unit, based on respective detection results by the signal component detection unit and by the high frequency component detection unit.

As described above, the light detection circuit is arranged in at least either one of the section on the transmission line between the input terminal and the optical amplification device and the section on the transmission line between the optical amplification device and the output terminal. In the embodiment of the invention, therefore, each of one or more light detection circuits can be arranged at a predetermined position on the transmission line. For example, in a configuration wherein the light splitting unit is arranged in the section on the transmission line between the input terminal and the optical amplification device so as to split a partial light from the signal light input through the input terminal (input signal light), the light detection circuit functions as an input signal light detection circuit. In a configuration wherein the light splitting unit is arranged in the section on the transmission line between the optical amplification device and the output terminal so as to split a partial light from the signal light amplified by the optical amplification device (amplified signal light), the light detection circuit functions as an amplified signal light detection circuit. Furthermore, in a configuration wherein the light splitting unit is arranged in the section on the transmission line between the optical amplification device and the output terminal so as to split a partial light from the signal light returning to the optical amplification device side via the output terminal (reflected signal light), the light detection circuit functions as a reflected signal light detection circuit.

BRIEF DESCRIPTION OF THE DRAWINGS

FIG. 2A to FIG. 2C are graphs for illustrating changes of output voltage with increase of dark current, in a light receiving unit in the common light detection circuit.

DETAILED DESCRIPTION

[Description of Embodiment of Present Invention]

Figure 1A:
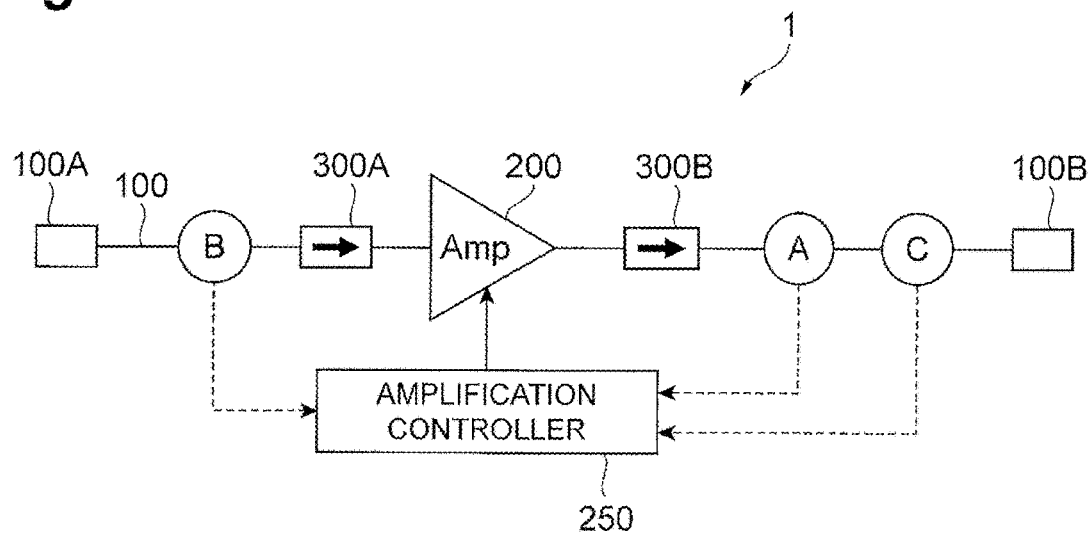
FIG. 1A is a drawing showing a schematic configuration of an optical amplifier according to the embodiment of the invention.

The embodiment of the present invention will be first described with aspects thereof enumerated below.

(1) An optical amplifier according to the embodiment of the invention comprises: an input terminal where signal light inputs; an output terminal where the signal light is output voltage; a transmission line which is arranged between the input terminal and the output terminal and on which the signal light outputs; an optical amplification device arranged on the transmission line; an amplification controller for controlling at least the optical amplification device; and a light detection circuit arranged in at least either one of a section on the transmission line between the input terminal and the optical amplification device and a section on the transmission line between the optical amplification device and the output terminal. The optical amplification device has a gain medium for amplifying the signal light and a pumping light source for supplying pumping light to the gain medium. The amplification controller performs a control of a drive current to the pumping light source such as a constant gain of amplifier keeping control, a constant output signal power keeping control, or a constant drive current keeping control, as amplification control. Particularly, as a first aspect, various light detection circuits are applicable to the light detection circuit, including an input signal light detection circuit for monitoring change in light quantity of the signal light before amplification (input signal light), an amplified signal light detection circuit for monitoring change in light quantity of the signal light after amplification (amplified signal light), and a reflected signal light power detection circuit for monitoring change of the signal light power reflected downstream of the optical amplifier (reflected signal light). These various light detection circuits may be singly applied to the optical amplifier or two or more types of light detection circuits out of these various light detection circuits may be applied to the optical amplifier. The light detection circuit applied to the optical amplifier has a structure for enabling a determination of an anomaly in the light detection circuit due to an increase of dark current in a photoelectric conversion element, by monitoring a high frequency component of modified signal light. Specifically, the light detection circuit has a light splitting unit, a light receiving unit, an extraction unit, a signal component detection unit, a high frequency component detection unit, and a detection controller. The light splitting unit extracts a partial light of the signal light as split light from the transmission line. The light receiving unit includes a photoelectric conversion element and outputs a voltage signal of the split light power received by the photoelectric conversion element. The extraction unit extracts a voltage component in a high frequency region included in a voltage component of the signal light, from the voltage of output signal from the light receiving unit. The "high frequency region" in the present specification shall mean a frequency region of not less than 1 MHz in the frequency region of the voltage of output signal from the light receiving unit. The signal component detection unit detects the voltage of output signal from the light receiving unit. The voltage signal to be detected by the signal component detection unit may be one including a part of the direct-current component (DC component at the frequency of 0 Hz) and does not have to include the voltage component of all signal components. Furthermore, the voltage signal to be detected by the signal component detection unit does not have to be a voltage signal in a continuous frequency region, either. The high frequency component detection unit detects a voltage of output signal from the extraction unit. Similarly, the voltage signal to be detected by the high frequency component detection unit may be one including a part of the voltage component of the signal light. The detection controller detects, at least, whether there is an increase of dark current in the photoelectric conversion element included in the light receiving unit (a circuit anomaly in the light detection circuit), based on respective detection results by the signal component detection unit and by the high frequency component detection unit.

Figure 7:
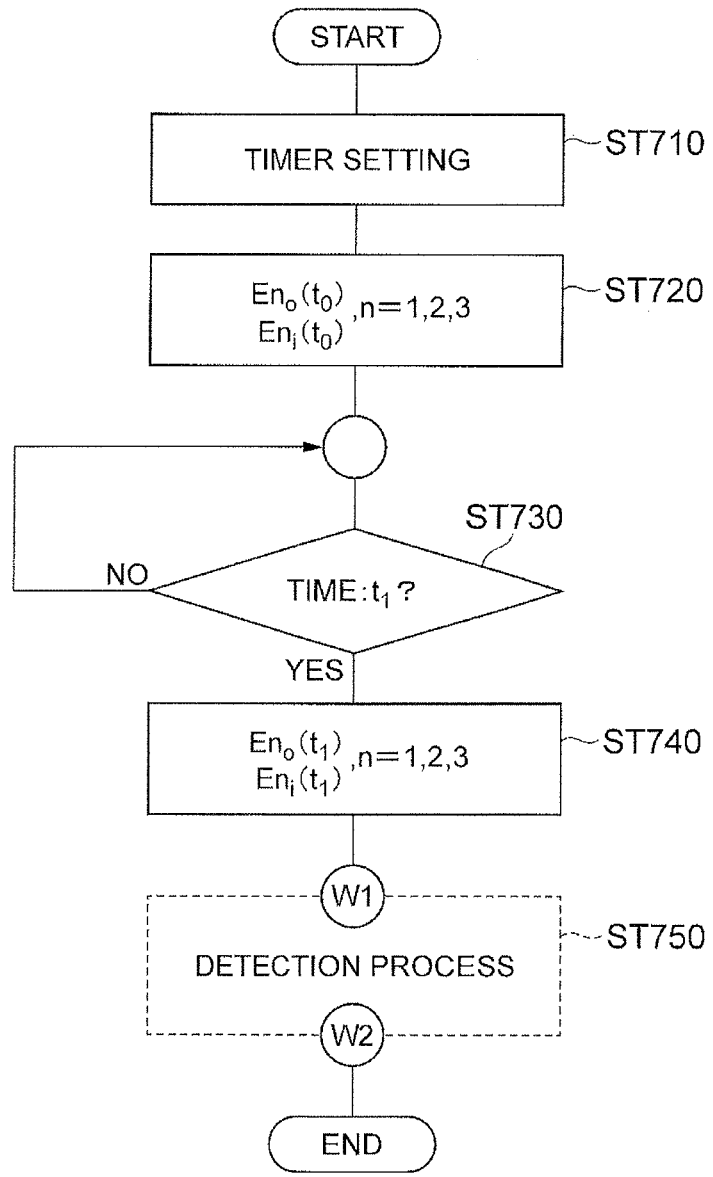
FIG. 7 is a flowchart for illustrating a determination operation of a circuit anomaly in the various signal light detection circuits shown in FIG. 6.
Figure 8A:
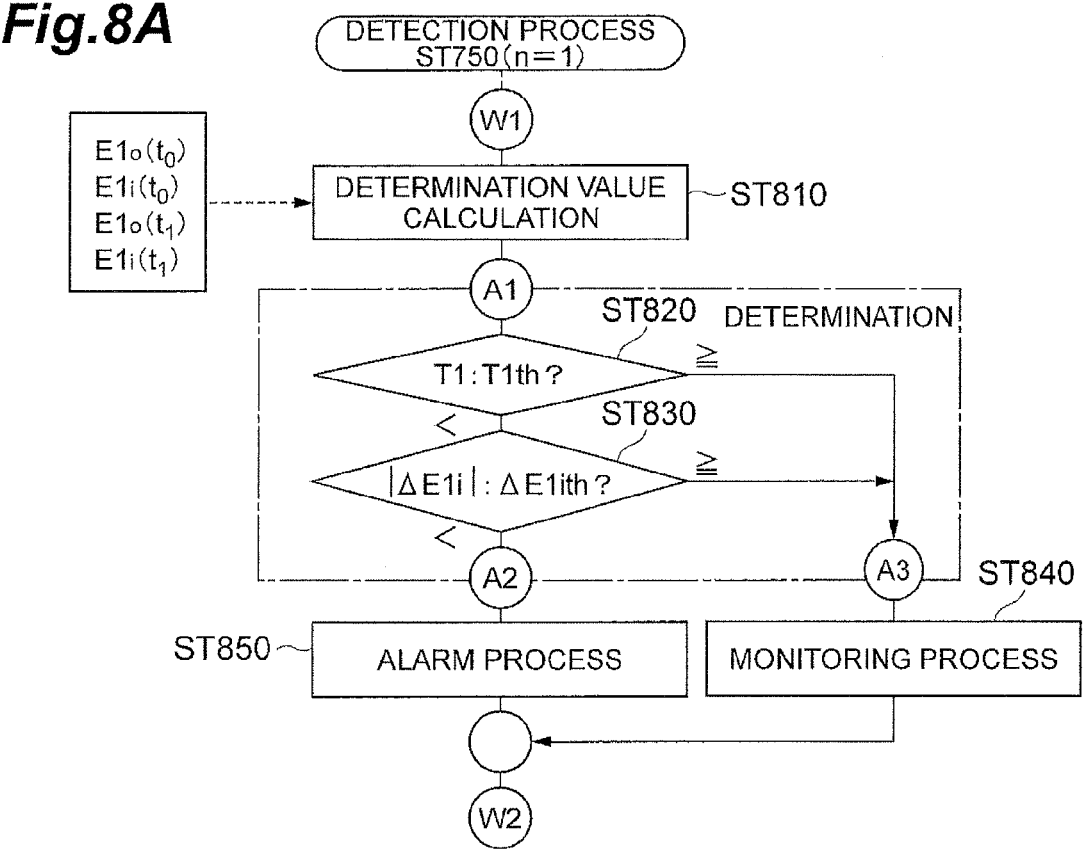
FIG. 8A and FIG. 8B are flowcharts for illustrating examples of a detection process in the amplified signal light detection circuit shown in FIG. 6.

(2) As a second aspect applicable to the first aspect, the light detection circuit applied to the optical amplifier is an amplified signal light detection circuit and, in that case, the amplified signal light detection circuit performs, for example, a detection process according to the flowcharts shown in FIGS. 7 and 8A, for detecting an anomaly in the photoelectric conversion element included in the light receiving unit. Specifically, in the amplified signal light detection circuit, the light splitting unit is arranged in the section on the transmission line between the optical amplification device and the output terminal and extracts a partial light of the amplified output signal light from the optical amplification device toward the output terminal, as a split light component from the transmission line. The detection controller performs a monitoring process of transmitting the voltage signal from the light receiving unit as a detection result to the amplification controller, and the detection controller determines that there is a circuit anomaly in the amplified signal light detection circuit due to the increase in dark current in the photoelectric conversion element, on the condition that a calculated ratio T1 is larger than a predetermined threshold T1th and an absolute value of $\Delta E1_i$ is larger than a predetermined threshold $\Delta E1_i$th, and then performs a predetermined alarm process.

(3) As a third aspect applicable to the second aspect, the alarm process in the amplified signal light detection circuit is carried out so as to notify the amplification controller of an alarm signal indicating the circuit anomaly in the amplified signal light detection circuit. On the other hand, the amplification controller, after receiving the alarm signal, switches a control method of the drive current to the pumping light source from the constant light output keeping control or the constant gain keeping control to the constant drive current keeping control of the drive current to the pumping light source. This configuration allows the amplified signal light detection circuit to prevent the reduction in voltage signal or amplification gain caused by the anomaly in the photoelectric conversion element included in the light receiving unit.

Figure 10A:
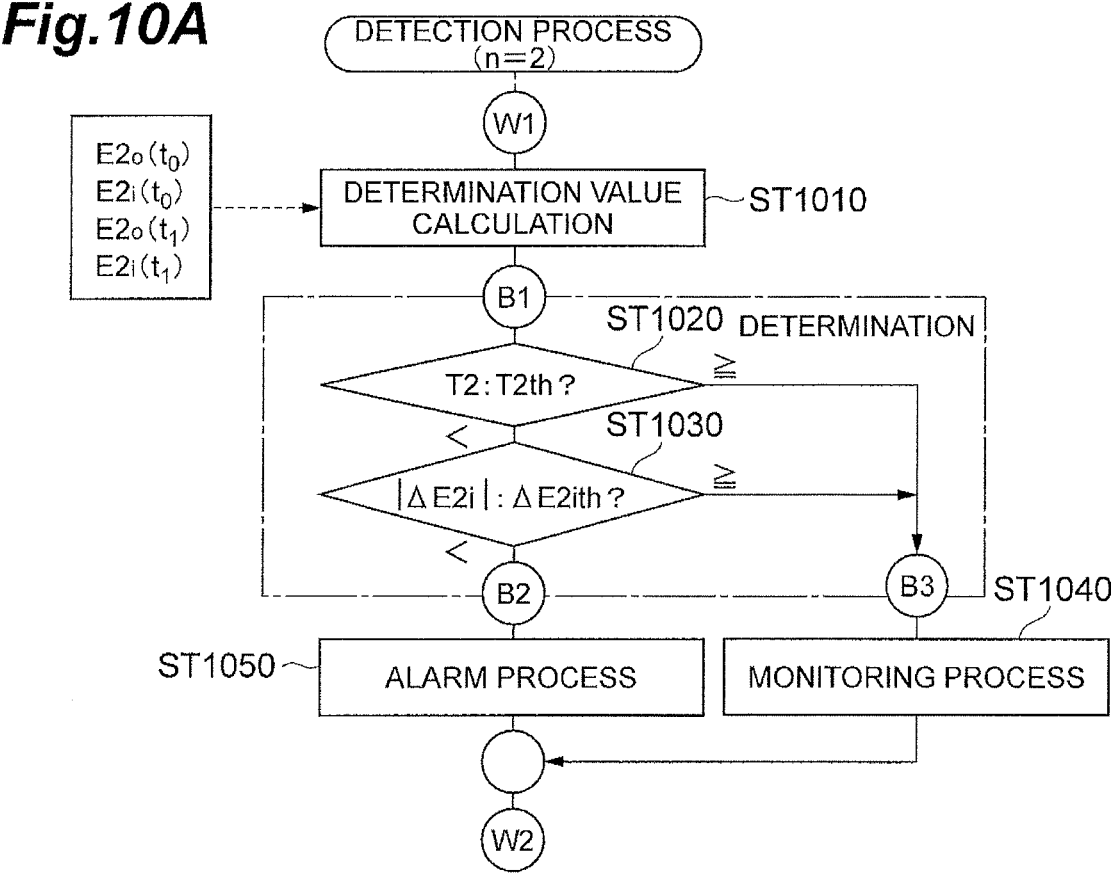
FIG. 10A and FIG. 10B are flowcharts for illustrating examples of the detection process in the input signal light detection circuit shown in FIG. 6.

(4) As a fourth aspect applicable to at least any one of the first to third aspects, the light detection circuit applied to the optical amplifier is an input signal light detection circuit and, in that case, the input signal light detection circuit performs, for example, a detection process according to the flowcharts shown in FIGS. 7 and 10A, for detecting an anomaly in the photoelectric conversion element included in the light receiving unit. Specifically, in the input signal light detection circuit the light splitting unit is arranged in the section on the transmission line between the input terminal and the optical amplification device and extracts a partial light of the input signal light propagating from the input terminal toward the optical amplification device, as a split light component from the transmission line. The detection controller performs a monitoring process of transmitting the voltage signal from the light receiving unit as a detection result to the amplification controller, and the detection controller determines that there is a circuit anomaly in the input signal light detection circuit due to the increase in dark current in the photoelectric conversion element, on the condition that a calculated ratio T2 is larger than a predetermined threshold T2th and an absolute value of $\Delta E2_i$ is larger than a predetermined threshold $\Delta E2_i$th, and then performs a predetermined alarm process.

Figure 11A:
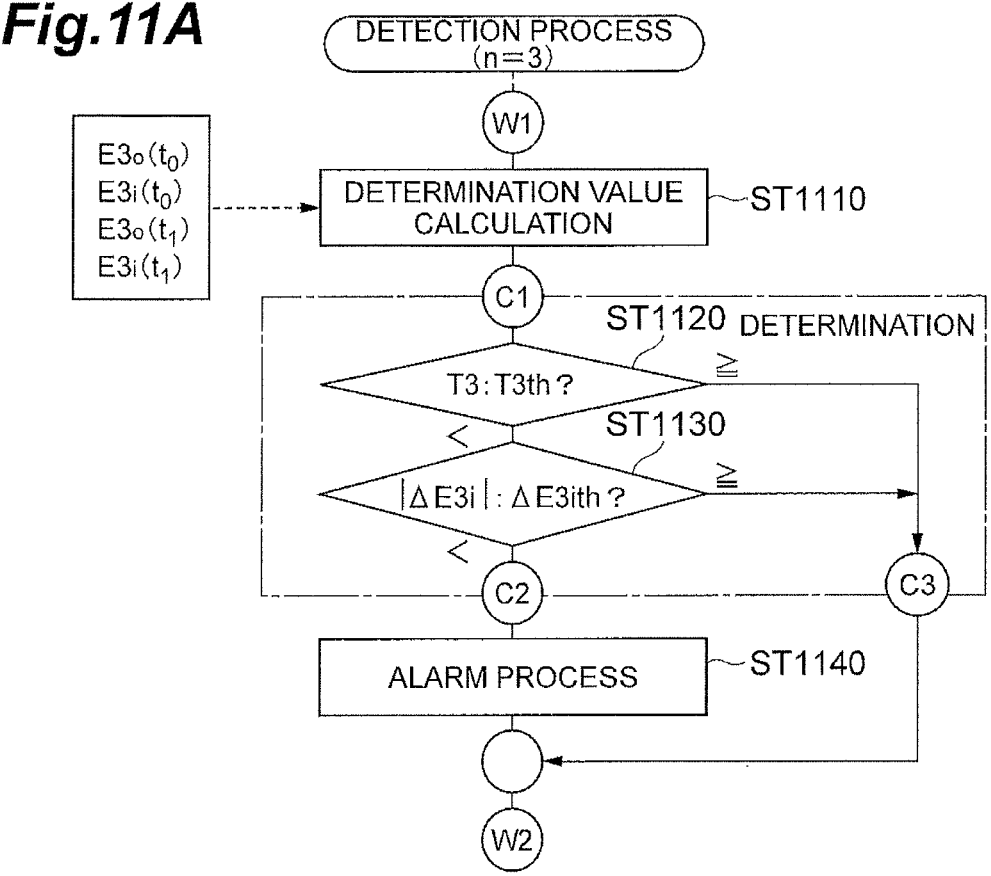
FIG. 11A and FIG. 11B are flowcharts for illustrating examples of the detection process in the reflected signal light detection circuit shown in FIG. 6.

(5) As a fifth aspect applicable to at least any one of the first to fourth aspects, the light detection circuit applied to the optical amplifier is a reflected signal light detection circuit and, in that case, the reflected signal light detection circuit performs, for example, a detection process according to the flowcharts shown in FIGS. 7 and 11A, for detecting an anomaly in the photoelectric conversion element included in the light receiving unit. Specifically, in the reflected signal light detection circuit the light splitting unit is arranged in the section on the transmission line between the optical amplification device and the output terminal and extracts a partial light of the reflected signal light propagating from the output terminal toward the optical amplification device, as a split light component from the transmission line. The detection controller performs a monitoring process of monitoring change in the voltage signal from the light receiving unit as a detection result, and the detection controller determines that there is a circuit anomaly in the reflected signal light detection circuit due to the increase in dark current in the photoelectric conversion element, on the condition that a ratio T3 is larger than a predetermined threshold T3th and an absolute value of $\Delta E3_i$ is larger than a predetermined threshold $\Delta E3_i$th, and then performs an alarm process.

(6) As a sixth aspect applicable to the fifth aspect, the alarm process in the reflected signal light detection circuit is carried out so as to notify the amplification controller of an alarm signal indicating the circuit anomaly in the reflected signal light detection circuit and, thereafter, a notification operation of the alarm signal is forcibly terminated. When the notification of the alarm signal to the amplification controller is released after the detection of the circuit anomaly in the reflected signal light detection circuit from the temporal change of the high frequency component of the reflected signal light in this manner, it becomes feasible to avoid the shutdown of the optical amplifier.

Figure 8B:
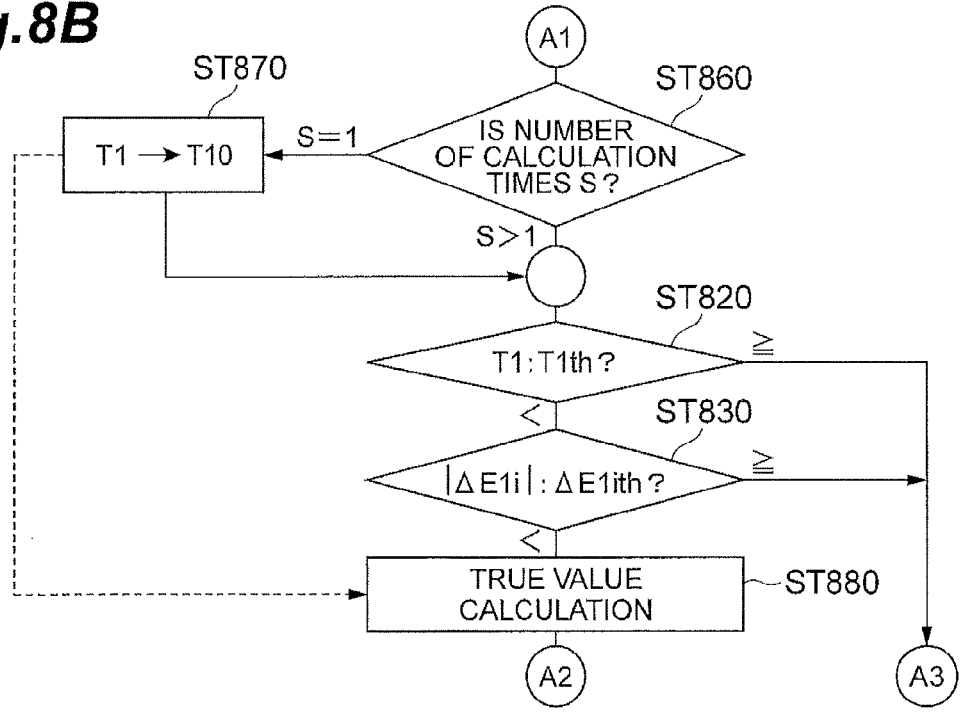

(7) As a seventh aspect applicable to at least any one of the first to sixth aspects, the light detection circuit applied to the optical amplifier is an amplified signal light detection circuit and, in that case, the amplified signal light detection circuit performs, for example, a detection process according to the flowcharts shown in FIG. 7, a part of FIG. 8A, and FIG. 8B, whereby the monitoring process can also be carried on even after occurrence of the circuit anomaly due to the increase in dark current in the photoelectric conversion element included in the light receiving unit. Namely, the amplified signal light detection circuit calculates a true value of the voltage component of the amplified signal light, which makes it feasible to perform an operation (monitoring process) equivalent to that in a situation without occurrence of the output anomaly due to the increase in dark current in the photoelectric conversion element. Specifically, the detection controller sets a value of the ratio T1 obtained at an arbitrary point (e.g., by the first calculation operation) as an initial value T10 and, in that state, it determines that there is a circuit anomaly in the amplified signal light detection circuit due to the increase in dark current in the photoelectric conversion element, on the condition that the ratio T1 calculated after the setting of the initial value T10 is larger than the predetermined threshold T1th and the absolute value of $\Delta E1_i$ is larger than the predetermined threshold $\Delta E1_i$th. On that occasion, in the monitoring process, a voltage of a noise component calculated based on the ratio T1 and the initial value T10 is subtracted from $E1_o(t)$, thereby calculating a true value $E1_r(t)$ of the voltage to be outputted from the signal component detection unit.

Figure 10B:
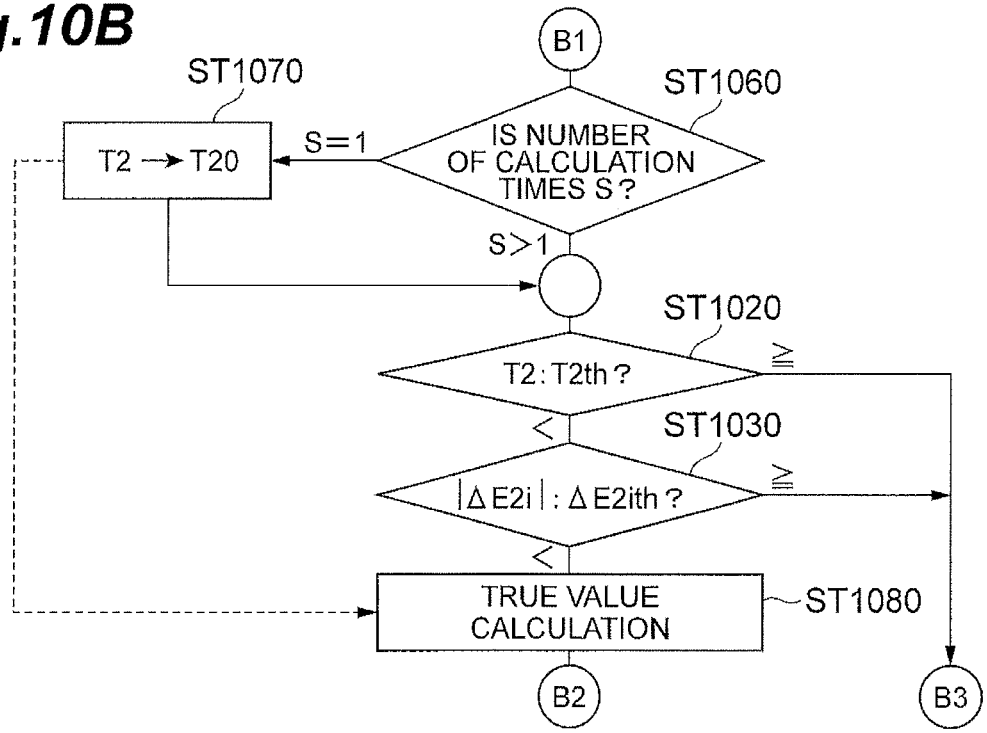

(8) As an eighth aspect applicable to at least any one of the first to seventh aspects, the light detection circuit applied to the optical amplifier is an input signal light detection circuit and, in that case, the input signal light detection circuit performs, for example, a detection process according to the flowcharts shown in FIG. 7, a part of FIG. 10A, and FIG. 10B, whereby the monitoring process can also be carried on even after occurrence of the circuit anomaly due to the increase in dark current in the photoelectric conversion element included in the light receiving unit. Namely, the input signal light detection circuit calculates a true value of the voltage component of the input signal light, which makes it feasible to perform an operation (monitoring process) equivalent to that in a situation without occurrence of the output anomaly due to the increase in dark current in the photoelectric conversion element. Specifically, the detection controller sets a value of the ratio T2 obtained at an arbitrary point (e.g., by the first calculation operation) as an initial value T20 and, in that state, it determines that there is a circuit anomaly in the input signal light detection circuit due to the increase in dark current in the photoelectric conversion element, on the condition that the ratio T2 calculated after the setting of the initial value T20 is larger than the predetermined threshold T2th and the absolute value of $\Delta E2_i$ is larger than the predetermined threshold $\Delta E2_i$th. On that occasion, in the monitoring process, a voltage of a noise component calculated based on the ratio T2 and the initial value T20 is subtracted from $E2_o(t)$, thereby calculating a true value $E2_r(t)$ of the voltage to be outputted from the signal component detection unit.

Figure 11B:
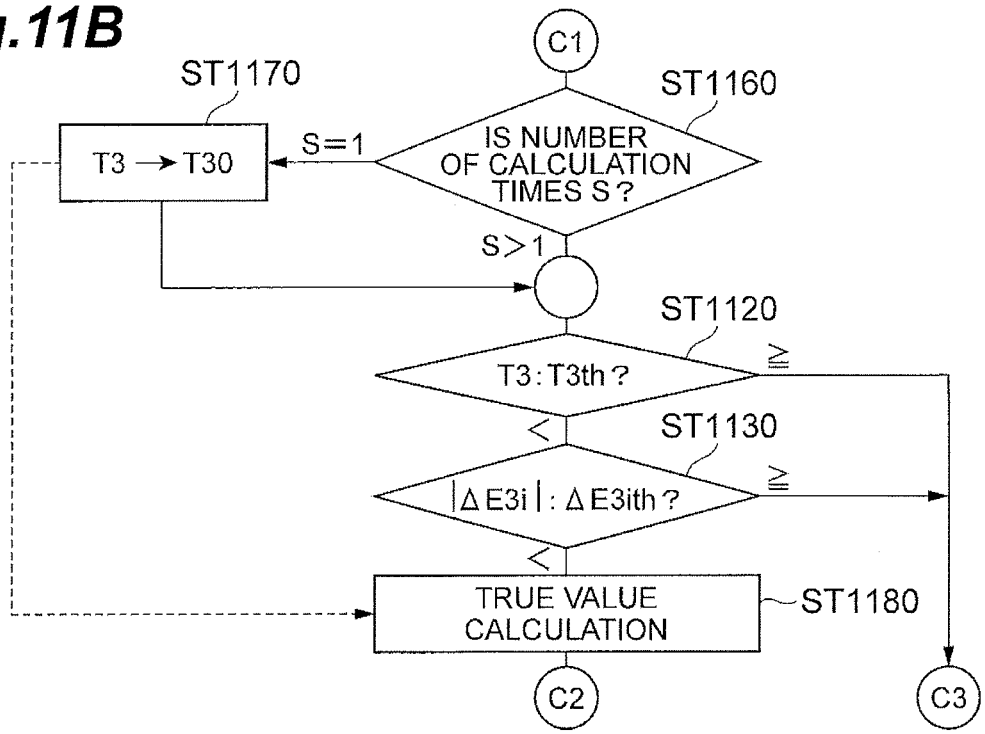

(9) As a ninth aspect applicable to at least any one of the first to eighth aspects, the light detection circuit applied to the optical amplifier is a reflected signal light detection circuit and, in that case, the reflected signal light detection circuit performs, for example, a detection process according to the flowcharts shown in FIG. 7, a part of FIG. 11A, and FIG. 11B, whereby the monitoring process can also be carried on even after occurrence of the circuit anomaly due to the increase in dark current in the photoelectric conversion element included in the light receiving unit. Namely, the reflected signal light detection circuit calculates a true value of the voltage component of the reflected signal light, which makes it feasible to perform an operation (monitoring process) equivalent to that in a situation without occurrence of the output anomaly due to the increase in dark current in the photoelectric conversion element. Specifically, the detection controller sets a value of the ratio T3 obtained at an arbitrary point (e.g., by the first calculation operation) as an initial value T30 and, in that state, it determines that there is a circuit anomaly in the reflected signal light detection circuit due to the increase in dark current in the photoelectric conversion element, on the condition that the ratio T3 calculated after the setting of the initial value T30 is larger than the predetermined threshold T3th and the absolute value of $\Delta E3_i$ is larger than the predetermined threshold $\Delta E3_i$th. On that occasion, in the monitoring process, a voltage of a noise component calculated based on the ratio T3 and the initial value T30 is subtracted from $E3_o(t)$, thereby calculating a true value $E3_r(t)$ of the voltage to be outputted from the signal component detection unit.

[Details of Embodiment of Present Invention]

Specific structures of the optical amplifiers according to the embodiment of the invention will be described below in detail with reference to the accompanying drawings. It should be noted that the present invention is not limited only to these illustrative examples and is intended for inclusion of all changes within the meaning and scope of equivalency to the scope of claims, as described in the scope of claims.

FIG. 1A is a drawing showing a schematic configuration of an optical amplifier according to the embodiment of the invention. The optical amplifier 1 in FIG. 1A has an input connector (input terminal) 100A for taking in signal light, an output connector (output terminal) 100B for outputting signal light, a transmission line 100 arranged between the input connector 100A and output connector 100B, an optical amplification device 200 arranged on the transmission line 100, an isolator 300A for transmitting light traveling from the input connector 100A toward the optical amplification device 200 and blocking light traveling from the optical amplification device 200 toward the input connector 100A, an isolator 300B for transmitting light traveling from the optical amplification device 200 toward the optical connector 100B and blocking light traveling from the output connector 100B toward the optical amplification device 200, and an amplification controller 250 for controlling a drive current to a pumping light source included in the optical amplification device 200. The optical amplifier 1 is also equipped with various light detection circuits to monitor the signal light at respective locations on the transmission line 100, for controlling the drive current to the amplification controller 250 and for monitoring an anomaly such as disconnection upstream and/or downstream. In the example of FIG. 1A, an amplified signal light detection circuit for monitoring the signal light amplified by the optical amplification device 200 (amplified signal light) is arranged at point A on the transmission line 100, an input signal light detection circuit for monitoring the signal light before amplification (input signal light) traveling from the input connector 100A toward the optical amplification device 200 is arranged at point B on the transmission line 100, and a reflected signal light detection circuit for monitoring the signal light reflected downstream of the optical amplifier 1 and traveling from the output connector 100B toward the optical amplification device 200 (reflected signal light) is arranged at point C on the transmission line 100. The foregoing light detection circuits may be singly arranged or in combination of two or more types, depending on purposes.

Figure 1B:
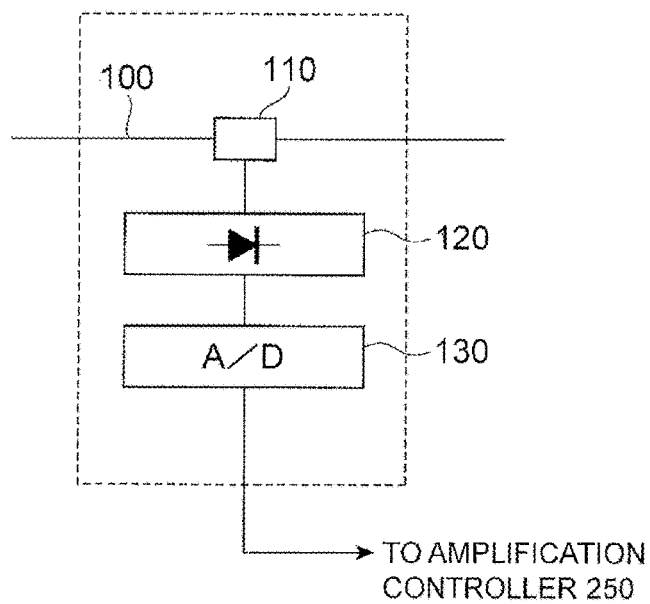
FIG. 1B is a drawing showing a configuration of a common light detection circuit.

A common light detection circuit, for example as shown in FIG. 1B, is configured, for monitoring the signal light at a predetermined location on the transmission line 100, with a light splitting unit (coupler) 110 for extracting a partial light of the signal light propagating on the transmission line 100, a light receiving unit 120 including a PD for outputting an electric current according to a light quantity of the split light extracted by the light splitting unit 110, and a current-voltage conversion circuit, the light receiving unit 120 being adapted for converting the electric current from the PD into a voltage signal, and an A/D converter 130 (represented by A/D in the drawing) for converting the output voltage from the light receiving unit 120 from an analog signal to a digital signal. In the simplest example the current-voltage conversion circuit in the light receiving unit 120 is realized by a resistor connected in parallel to the PD.

In the optical amplifier to which the common light detection circuit as described above is applied, the PD is used as a photoelectric conversion element. The PD can be considered as an electric current source that outputs an electric current according to a quantity of received light and, when $P_{in}$ (W) represents a quantity of incident light to the PD and $\eta$ (A/W) a photoelectric conversion efficiency of the PD, a relation of $I_{out}=P_{in}\cdot\eta$ holds between an output current $I_{out}$ (A) of the PD and the quantity of incident light $P_{in}$ (W). In passing, an electric current component appearing without incidence of light into the PD is called dark current and is a noise source in detection of signal light.

FIGS. 2A to 2C show graphs for illustrating changes in output voltage with increase in dark current, in the light receiving unit in the common light detection circuit (the light receiving unit 120 in FIG. 1B). The upper half of FIG. 2A shows voltages of frequency components (powers of all signal components) included in the voltage of output signal from the light receiving unit 120, and the lower half of FIG. 2A shows voltages of high frequency components not less than 1 MHz (powers of the high frequency components). In general, an increase in quantity of received light by the PD included in the light receiving unit 120 results, as shown in FIG. 2B, in changing the waveforms of both of all the signal components (the upper half of FIG. 2B) and the high frequency components (the lower half of FIG. 2B) to those as indicated by solid lines. In FIG. 2B broken lines indicate the waveforms in FIG. 2A and hatched portions a noise component with increase in quantity of received light. With an increase of dark current in the PD, as shown in FIG. 2C, the voltage from the light receiving unit 120 comes to include the noise component (hatched portions) increased at both of all the signal components (the upper half of FIG. 2C) and the high frequency components (the lower half of FIG. 2C).

Figure 3:
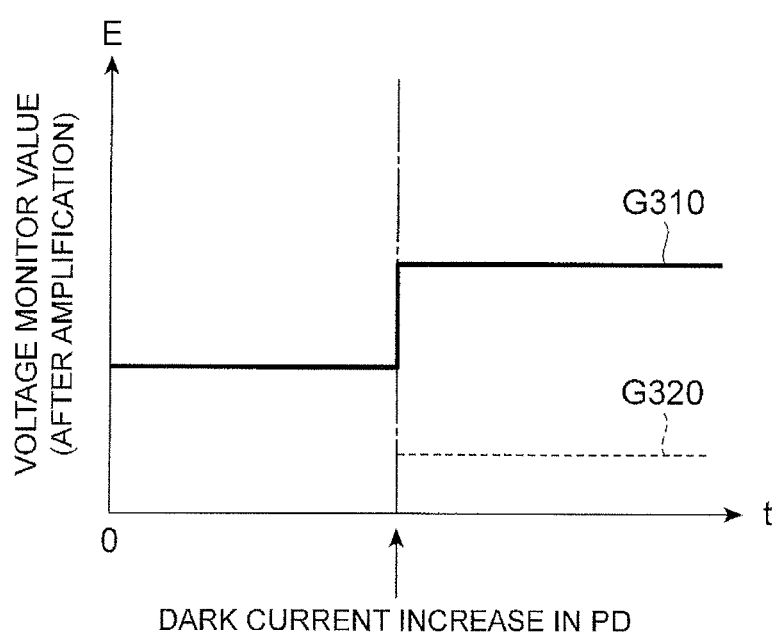
FIG. 3 is a graph showing a change before and after an increase of dark current, of the output voltage (monitor voltage) from the light receiving unit in the common light detection circuit.

Particularly, in the amplified signal light detection circuit, the increase in dark current in the PD as shown in FIG. 2C leads to an increase in apparent light quantity (light quantity of amplified signal light), causing an erroneous determination that an apparent amplification gain also increases. For this reason, the amplification control functions to lower the drive current supplied to the pumping light source, so as to decrease actual light output (the light quantity of signal light after amplification). This situation is shown in FIG. 3. In FIG. 3, specifically, graph G310 shows the voltage of output signal (monitor voltage) from the light receiving unit 120, in which the monitor voltage increases at the timing of the increase in dark current in the PD. On the other hand, graph G320 shows the monitor voltage corresponding to the light quantity of actual amplified signal light, in which the drive current decreases at the timing of the increase in dark current in the PD, so as to decrease the monitor voltage as well.

Figure 4A:
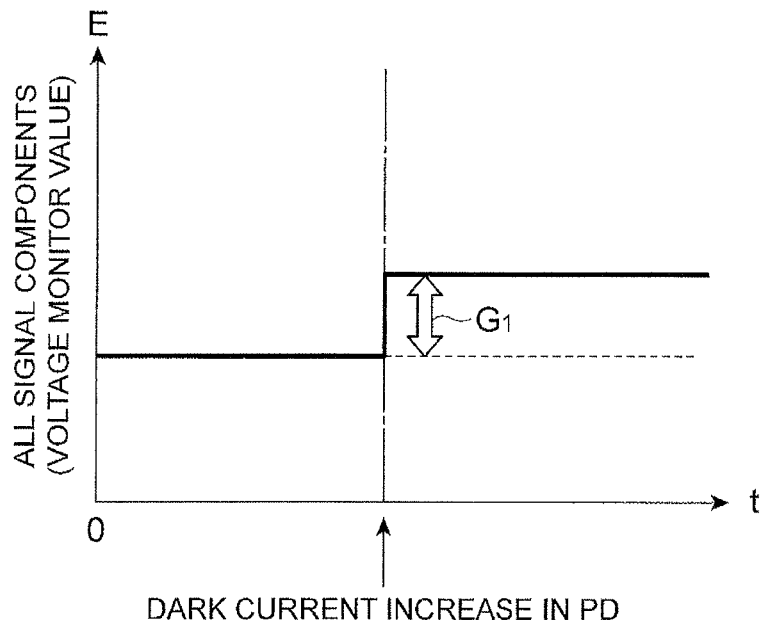
FIG. 4A and FIG. 4B are graphs for illustrating influence of increase of dark current, on respective voltage components of a voltage component including all signal components and a voltage component including high frequency components, as to the output voltage from the light receiving unit in the common light detection circuit.
Figure 4B:
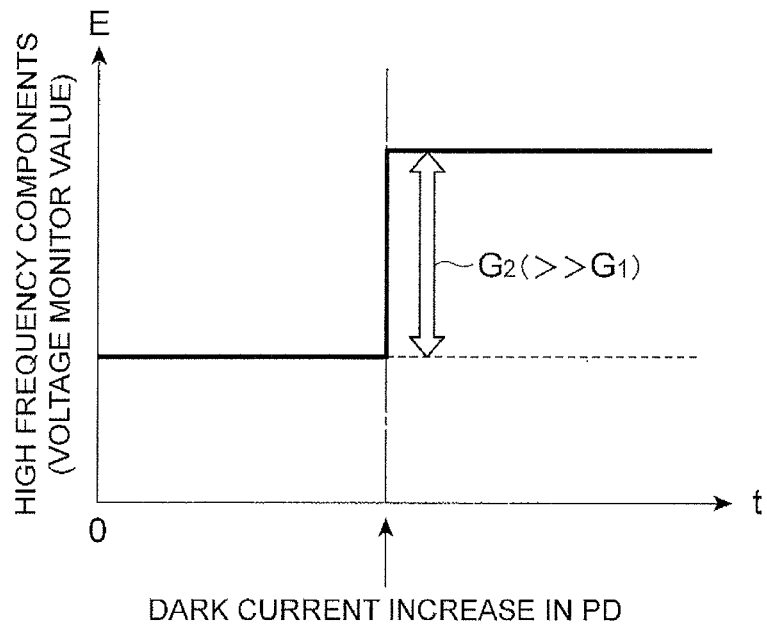

However, according to Inventors' knowledge, a change amount of output voltage due to the increase in dark current in the PD is significantly different between the voltage component of all the signal components and the voltage component of the high frequency components, as shown in FIGS. 4A and 4B. Namely, FIG. 4A shows a temporal change of the voltage component of all the signal components, in which the monitor voltage shows a change of $G_1$ before and after the increase in dark current in the PD. On the other hand, FIG. 4B shows a temporal change of the voltage component of the high frequency components, in which the monitor voltage shows a large change of $G_2$ ($\gg G_1$) before and after the increase in dark current in the PD. Noting that the voltage component of all the signal components is mostly dominated by the direct-current component (DC component at the frequency of 0 Hz), it is seen that a ratio of temporal change amounts of all the signal components and the high frequency components in the case of the increase in dark current in the PD is significantly different from that in the case of the increase in quantity of received light. Therefore, by monitoring the ratio of temporal change amounts of all the signal components and the high frequency components, we can determine that a deviation of the ratio from a certain value should be an increase of dark current in the PD.

Figure 5:
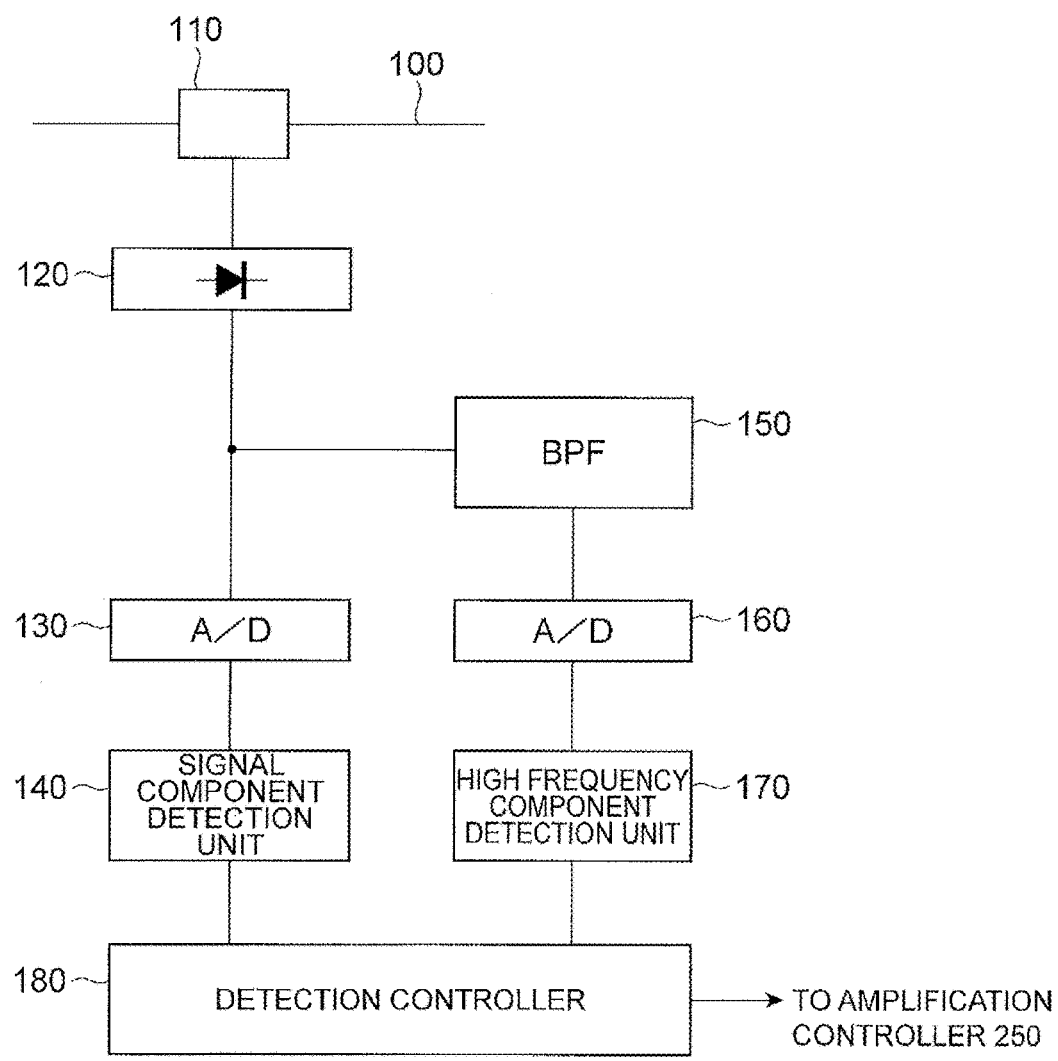
FIG. 5 is a drawing showing a fundamental configuration of various signal light detection circuits applicable to the embodiment of the invention.

In the present embodiment, based on the above-described knowledge, a light detection circuit with a structure shown in FIG. 5 is adopted as the light detection circuit to be applied to the optical amplifier 1. It is noted that the light detection circuit shown in FIG. 5 can be applied to any one of the amplified signal light detection circuit, the input signal light detection circuit, and the reflected signal light detection circuit.

The light detection circuit of the present embodiment shown in FIG. 5 is different from the common light detection circuit shown in FIGS. 1A and 1B, in that the light detection circuit of the present embodiment further has a signal component detection unit 140, a band-pass filter (BPF hereinafter) 150 which is an extraction unit for extracting the high frequency components, an A/D converter (represented by A/D in the drawing) 160, a high frequency component detection unit 170, and a detection controller 180 for determining a circuit anomaly in the light detection circuit. Since the light detection circuit of the present embodiment is configured so that the signal component detection unit 140 and the high frequency component detection unit 170 both use the electric signal output from the light receiving unit 120, the BPF 150 to receive the electric signal from the light receiving unit 120 is connected in parallel to main wiring from the light receiving unit 120 to the A/D converter 130. For supplying the electric signal at an identical level to the A/D converter 130 and to the BPF 150, the light receiving unit 120 needs to output a voltage signal according to the quantity of received light. For this reason, the light receiving unit 120 includes the PD as an electric current source and the current-voltage conversion circuit.

The signal component detection unit 140 detects the voltage of output signal from the light receiving unit 120, via the A/D converter 130. The voltage signal detected by the signal component detection unit 140 may be one including a part of the direct-current component (DC component at the frequency of 0 Hz), and it does not have to include the voltage component of all the signal components. The voltage signal detected by the signal component detection unit 140 does not have to be the voltage signal in a continuous frequency region, either. The BPF 150 extracts the voltage component in the high frequency region of not less than 1 MHz included in the voltage component of the signal light, from the voltage of output signal from the light receiving unit 120. The high frequency component detection unit 170 detects the voltage of output signal from the BPF 150, via the A/D converter 160. The voltage signal detected by the high frequency component detection unit 170 may also be one including a part of the voltage component of the signal light. The detection controller 180 detects, at least, whether there is an increase of dark current in the PD included in the light receiving unit 120 (a circuit anomaly in the light detection circuit), based on the respective detection results by the signal component detection unit 140 and by the high frequency component detection unit 170.

Figure 6:
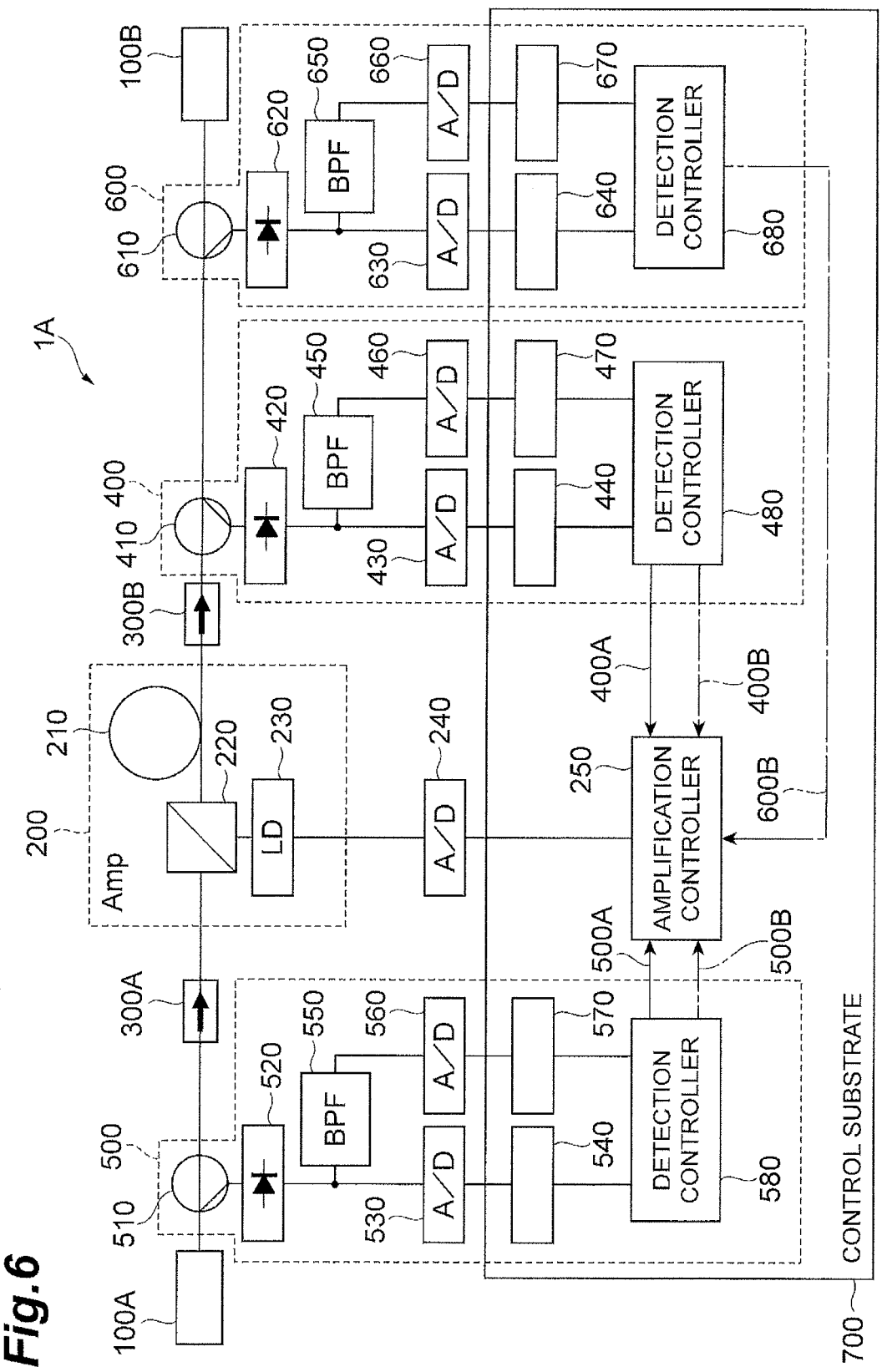
FIG. 6 is a drawing showing a specific configuration example of an optical amplifier according to the embodiment of the invention.

FIG. 6 is a drawing showing a specific configuration example of the optical amplifier according to the embodiment of the invention. Specifically, the optical amplifier 1A shown in FIG. 6 has the input connector (input terminal) 100A for taking in the signal light, the output connector (output terminal) 100B for outputting the signal light, the transmission line 100 arranged between the input connector 100A and output connector 100B, the optical amplification device 200 arranged on the transmission line 100, the isolator 300A for transmitting the light traveling from the input connector 100A toward the optical amplification device 200 and blocking the light traveling from the optical amplification device 200 toward the input connector 100A, the isolator 300B for transmitting the light traveling from the optical amplification device 200 toward the optical connector 100B and blocking the light traveling from the output connector 100B toward the optical amplification device 200, and the amplification controller 250 for controlling the drive current to the pumping light source included in the optical amplification device 200. The optical amplifier 1A is also equipped with an amplified signal light detection circuit 400, an input signal light detection circuit 500, and a reflected signal light detection circuit 600 as light detection circuits to monitor the signal light at respective locations on the transmission line 100, for controlling the drive current by the amplification controller 250 and for monitoring an anomaly such as disconnection upstream and/or downstream.

The optical amplification device 200 has an amplification optical fiber 210, for example, to which an Er-doped optical fiber or the like can be applied as a transmission medium for amplification, a multiplexer 220 for multiplexing the signal light as an amplification object, and the pumping light, and an LD 230 as a pumping light source for supplying the pumping light. The amplification controller 250 controls the drive current supplied to the LD 230, via the A/D converter 240 (represented by A/D in the drawing) (amplification control).

The amplified signal light detection circuit 400 is a first light detection circuit for monitoring the signal light after amplification (amplified signal light), and has a light splitting unit (first light splitting element) 410, a light receiving unit (first light receiving element) 420 including a PD and a current-voltage conversion circuit, an extraction unit (first extraction element) 450 for extracting the high frequency components, A/D converters 430, 460 (each of which is represented by A/D in the drawing), a signal component detection unit (first signal component detection element) 440, a high frequency component detection unit (first high frequency component detection element) 470, and a detection controller (first detection control element) 480. The light splitting unit 410 is arranged in a section on the transmission line 100 between the optical amplification device 200 and the input connector 100B and extracts a partial light of the amplified signal light from the optical amplification device 200 toward the output connector 100B, as a split light component from the transmission line 100. It is noted that each of the light splitting unit 410, light receiving unit 420, extraction unit 450, A/D converters 430, 460, signal component detection unit 440, high frequency component detection unit 470, and detection controller 480 has the same configuration and function as the corresponding constituent element in FIG. 5.

The input signal light detection circuit 500 is a second light detection circuit for monitoring the signal light before amplification (input signal light) taken in through the input connector 100A, and has a light splitting unit (second light splitting element) 510, a light receiving unit (second light receiving element) 520 including a PD and a current-voltage conversion circuit, an extraction unit (second extraction element) 550, A/D converters 530, 560 (each of which is represented by A/D in the drawing), a signal component detection unit (second signal component detection element) 540, a high frequency component detection unit (second high frequency component detection element) 570, and a detection controller (second detection control element) 580. The light splitting unit 510 is arranged in a section on the transmission line 100 between the input connector 100A and the optical amplification device 200 and extracts a partial light of the input signal light traveling from the input connector 100A toward the optical amplification device 200, as a split light component from the transmission line 100. It is noted that each of the light splitting unit 510, light receiving unit 520, extraction unit 550, A/D converters 530, 560, signal component detection unit 540, high frequency component detection unit 570, and detection controller 580 has the same configuration and function as the corresponding constituent element in FIG. 5.

The reflected signal light detection circuit 600 is a third light detection circuit for monitoring the signal light reflected downstream of the optical amplifier 1A (reflected signal light), and has a light splitting unit (third light splitting element) 610, a light receiving unit (third light receiving element) 620 including a PD and a current-voltage conversion circuit, an extraction unit (third extraction element) 650, A/D converters 630, 660 (each of which is represented by A/D in the drawing), a signal component detection unit (third signal component detection element) 640, a high frequency component detection unit (third high frequency component detection element) 670, and a detection controller (third detection control element) 680. The light splitting unit 610 is arranged in the section on the transmission line 100 between the optical amplification device 200 and the output connector 100B and extracts a partial light of the reflected signal light traveling from the output connector 100B toward the optical amplification device 200, as a split light component from the transmission line 100. It is noted that each of the light splitting unit 610, light receiving unit 620, extraction unit 650, A/D converters 630, 660, signal component detection unit 640, high frequency component detection unit 670, and detection controller 680 has the same configuration and function as the corresponding constituent element in FIG. 5.

Furthermore, the optical amplifier 1A has a common control substrate 700 and, the signal component detection unit 440, high frequency component detection unit 470, and detection controller 480 in the amplified signal light detection circuit 400, the signal component detection unit 540, high frequency component detection unit 570, and detection controller 580 in the input signal light detection circuit 500, and the signal component detection unit 640, high frequency component detection unit 670, and detection controller 680 in the reflected signal light detection circuit 600 are constructed on this control substrate 700. In an amplification operation of the optical amplifier 1A, the detection controller 480 in the amplified signal light detection circuit 400 transmits a detection signal 400A as light quantity information of the amplified signal light and an alarm signal 400B as a notification of a circuit anomaly, to the amplification controller 250. The detection controller 580 in the input signal light detection circuit 500 transmits a detection signal 500A as light quantity information of the input signal light and an alarm signal 500B as a notification of a circuit anomaly, to the amplification controller 250. The detection controller 680 in the reflected signal light detection circuit 600 transmits an alarm signal 600B as a notification of an anomaly (disconnection or the like) downstream of the optical amplifier 1A, to the amplification controller 250.

Next, circuit anomaly determination operations in the respective detection controllers of the detection controller 480 in the amplified signal light detection circuit 400, the detection controller 580 in the input signal light detection circuit 500, and the detection controller 680 in the reflected signal light detection circuit 600 as described above will be described in detail using FIG. 7, FIGS. 8A and 8B, FIG. 9, FIGS. 10A and 10B, and FIGS. 11A and 11B. FIG. 7 is a flowchart for illustrating the circuit anomaly determination operation common to all of the detection controllers 480, 580, and 680. In the description hereinbelow, suffix n to each parameter indicates parameters individually acquired by the respective detection controllers 480, 580, and 680 and, specifically, n=1 shall indicate the parameters acquired by the detection controller 480, n=2 the parameters acquired by the detection controller 580, and n=3 the parameters acquired by the detection controller 680.

In each detection controller, a timer is set for time management (step ST710), and each light detection circuit acquires $En_o(t0)$ at a time t0 as a voltage of output signal from the signal component detection unit and $En_i(t0)$ at the time t0 as a voltage of output signal from the high frequency component detection unit (step ST720). Furthermore, when a time t1 has elapsed (step ST730), each light detection circuit acquires $En_o(t1)$ at the time t1 as a voltage of output signal from the signal component detection unit and $En_i(t1)$ at the time t1 as a voltage of output signal from the high frequency component detection unit (step ST740). Using the parameters acquired respectively from the signal component detection unit and high frequency component detection unit as described above, each detection controller performs a detection process of a circuit anomaly due to an increase of dark current in the PD (step ST750).

FIG. 8A and FIG. 8B are flowcharts for illustrating examples of the detection process (step ST750) carried out by the detection controller 480 in the amplified signal light detection circuit 400; FIG. 8A shows the flowchart for illustrating the example of the first detection process by the detection controller 480; FIG. 8B shows the flowchart for illustrating the example of the second detection process by the detection controller 480.

First, in the first detection process in FIG. 8A, a determination value calculation operation is carried out using the parameters $E1_o(t0)$, $E1_i(t0)$, $E1_o(t1)$, and $E1_i(t1)$ already acquired in step ST710 to step ST740 (step ST810). In this determination value calculation operation, when a temporal change of $E1_o(t)$ from the time t0 to the time t1 is defined as $\Delta E1_o$ ($=E1_o(t0)-E1_o(t1)$) and a temporal change of $E1_i(t)$ from the time t0 to the time t1 as $\Delta E1_i(=E1_i(t0)-E1_i(t1))$, a ratio T1 of $\Delta E1_o/E1_o(t0)$ and $\Delta E1_i/E1_i(t0)$ is calculated from the following equation:

$$\Delta E1_o/E1_o(t0):\Delta E1_i/E1_i(t0)=1:T1.$$

Then, the ratio T1 thus calculated is compared with a predetermined threshold T1th (step ST820) and, when the ratio T1 is larger than the threshold T1th, an absolute value $|\Delta E1_i|$ of $\Delta E1_i$ is further compared with a predetermined threshold $\Delta E1_i$th (step ST830). When the result of the comparison is that the absolute value $|\Delta E1_i|$ is larger than the predetermined threshold $\Delta E1_i$th, the detection controller 480 determines that there is a circuit anomaly in the amplified signal light detection circuit 400 due to an increase of dark current in the PD in the light receiving unit 420, and performs an alarm process (step ST850). On the other hand, when it is determined in either of step ST820 and step ST830 that the ratio T1 or the absolute value $|\Delta E1_i|$ is not more than the threshold, a normal monitoring process such as the amplification control or disconnection monitoring is carried on (step ST840). In the monitoring process of step ST840, the detection signal 400A as light quantity information of the amplified signal light is transmitted from the detection controller 480 to the amplification controller 250. In the alarm process of step ST850, the detection controller 480 notifies the amplification controller 250 of the alarm signal 400B according to needs. Furthermore, the amplification controller 250 notified of the alarm signal 400B switches the control method of the drive current to the LD 230 from the constant light output keeping control or the constant gain keeping control to the constant drive current keeping control of the drive current to the LD 230. This configuration allows the amplified signal light detection circuit 400 to prevent reduction in the voltage signal or the amplification gain caused by an anomaly in the PD included in the light receiving unit 420.

Figure 9:
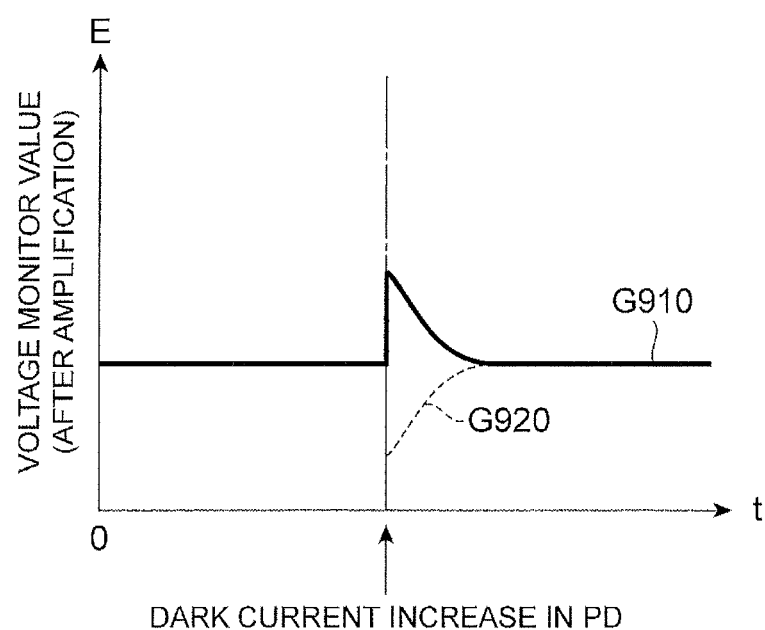
FIG. 9 is a graph showing a change before and after an increase of dark current, of the output voltage (monitor voltage) from the light receiving unit in the amplified signal light detection circuit, as an example of amplification control in the embodiment of the invention.

FIG. 9 is a graph of output voltage (monitor voltage) from the light receiving unit 420, with switching of the drive current control method by the amplification controller 250 as described above. When the control is carried out so as to keep the drive current supplied to the LD 230 constant as described above, reduction in light quantity of actual amplified signal light is avoided. Specifically, in FIG. 9, graph G910 indicates the voltage of output signal (monitor voltage) from the light receiving unit 420, in which the monitor voltage temporarily increases at the timing of an increase of dark current in the PD but becomes stabilized by the control to keep the drive current constant. On the other hand, graph G920 indicates the monitor voltage corresponding to the light quantity of actual amplified signal light, in which, since the drive current becomes stabilized at the timing of the increase in dark current in the PD, the monitor voltage also temporarily decreases at the timing of the increase in dark current but then increases with time.

On the other hand, the second detection process in FIG. 8B is different in the determination operation from the above-described first detection process. Specifically, in this second detection process, a value calculated at an arbitrary point (step ST860), of the ratio T1 obtained by the determination value calculation operation in step ST810 is set as an initial value T10 (step ST870). In the example of FIG. 8B, the ratio T1 obtained by the first calculation operation is set as the initial value T10. The ratio T1 calculated after the setting of the initial value T10 is compared with the threshold T1th (step ST820) and, when the ratio T1 is larger than the predetermined threshold T1th, the absolute value $|\Delta E1_i|$ of $\Delta E1_i$ is further compared with the predetermined threshold $\Delta E1_i$th (step ST830). When the result of the comparison is that the absolute value $|\Delta E1_i|$ is larger than the threshold $\Delta E1_i$th, the detection controller 480 determines that there is a circuit anomaly in the amplified signal light detection circuit 400 due to the increase in dark current in the PD in the light receiving unit 420, and carries out a true value calculation (step ST880). In this step ST880, a true value $E1_r(t)$ of the voltage to be outputted from the signal component detection unit 440 is calculated by subtracting a voltage of a noise component calculated based on the ratio T1 and initial value T10, from $E1_o(t)$. On the other hand, if it is determined in either of step ST820 and ST830 that the ratio T1 or the absolute value $|\Delta E1_i|$ is not more than the threshold, the normal monitoring process such as the amplification control or the disconnection monitoring is carried on (step ST840). In the alarm process of step ST850, the amplification controller 250 is notified of the true value $E1_r(t)$ calculated in step ST880, as the detection signal 400A, along with the alarm signal 400B.

FIG. 10A and FIG. 10B are flowcharts for illustrating examples of the detection process (step ST750) carried out by the detection controller 580 in the input signal light detection circuit 500; FIG. 10A shows the flowchart for illustrating the example of the first detection process by the detection controller 580; FIG. 10B shows the flowchart for illustrating the example of the second detection process by the detection controller 580.

First, in the first detection process in FIG. 10A, a determination value calculation operation is carried out using the parameters $E2_o(t0)$, $E2_i(t0)$, $E2_o(t1)$, and $E2_i(t1)$ already acquired in step ST710 to step ST740 (step ST1010). In this determination value calculation operation, when a temporal change of $E2_o(t)$ from the time t0 to the time t1 is defined as $\Delta E2_o(=E2_o(t0)-E2_o(t1))$ and a temporal change of $E2_i(t)$ from the time t0 to the time t1 as $\Delta E2_i(=E2_i(t0)-E2_i(t1))$, a ratio T2 of $\Delta E2_o/E2_o(t0)$ and $\Delta E2_i/E2_i(t0)$ is calculated from the following equation:

$$\Delta E2_o/E2_o(t0):\Delta E2_i/E2_i(t0)=1:T2.$$

Then, the ratio T2 thus calculated is compared with a predetermined threshold T2th (step ST1020) and, when the ratio T2 is larger than the threshold T2th, an absolute value $|\Delta E2_i|$ of $\Delta E2_i$ is further compared with a predetermined threshold $\Delta E2_i$th (step ST1030). When the result of the comparison is that the absolute value $|\Delta E2_i|$ is larger than the predetermined threshold $\Delta E2_i$th, the detection controller 580 determines that there is a circuit anomaly in the input signal light detection circuit 500 due to the increase in dark current in the PD in the light receiving unit 520, and performs an alarm process (step ST1050). On the other hand, when it is determined in either of step ST1020 and step ST1030 that the ratio T2 or the absolute value $|\Delta E2_i|$ is not more than the threshold, the normal monitoring process such as the amplification control or the disconnection monitoring is carried out (step ST1040). In the monitoring process of step ST1040, the detection signal 500A as light quantity information of the input signal light is transmitted from the detection controller 580 to the amplification controller 250. In the alarm process of step ST1050, the detection controller 580 notifies the amplification controller 250 of the alarm signal 500B according to needs.

On the other hand, the second detection process in FIG. 10B is different in the determination operation from the above-described first detection process. Specifically, in this second detection process, a value calculated at an arbitrary point (step ST1060), of the ratio T2 obtained by the determination value calculation operation in step ST1010 is set as an initial value T20 (step ST1070). In the example of FIG. 10B, the ratio T2 obtained by the first calculation operation is set as the initial value T20. The ratio T2 calculated after the setting of the initial value T20 is compared with the threshold T2th (step ST1020) and, when the ratio T2 is larger than the predetermined threshold T2th, the absolute value $|\Delta E2_i|$ of $\Delta E2_i$ is further compared with the predetermined threshold $\Delta E2_i$th (step ST1030). When the result of the comparison is that the absolute value $|\Delta E2_i|$ is larger than the threshold $\Delta E2_i$th, the detection controller 580 determines that there is a circuit anomaly in the input signal light detection circuit 500 due to the increase in dark current in the PD in the light receiving unit 520, and carries out a true value calculation (step ST1080). In this step ST1080, a true value $E2_r(t)$ of the voltage to be outputted from the signal component detection unit 540 is calculated by subtracting a voltage of a noise component calculated based on the ratio T2 and initial value T20, from $E2_o(t)$. On the other hand, if it is determined in either of step ST1020 and ST1030 that the ratio T2 or the absolute value $|\Delta E2_i|$ is not more than the threshold, the normal monitoring process such as the amplification control or the disconnection monitoring is carried on (step ST1040). In the alarm process of step ST1050, the amplification controller 250 is notified of the true value E2$_r$(t) calculated in step ST1080, as the detection signal 500A, along with the alarm signal 500B.

FIG. 11A and FIG. 11B are flowcharts for illustrating examples of the detection process (step ST750) carried out by the detection controller 680 in the reflected signal light detection circuit 600; FIG. 11A shows the flowchart for illustrating the example of the first detection process by the detection controller 680; FIG. 11B shows the flowchart for illustrating the example of the second detection process by the detection controller 680.

First, in the first detection process in FIG. 11A, a determination value calculation operation is carried out using the parameters E3$_o$(t0), E3$_i$(t0), E3$_o$(t1), and E3$_i$(t1) already acquired in step ST710 to step ST740 (step ST1110). In this determination value calculation operation, when a temporal change of E3$_o$(t) from the time t0 to the time t1 is defined as ΔE3$_o$(=E3$_o$(t0)−E3$_o$(t1)) and a temporal change of E3$_i$(t) from the time t0 to the time t1 as ΔE3$_i$(=E3$_i$(t0)−E3$_i$(t1)), a ratio T3 of ΔE3$_o$/E3$_o$(t0) and ΔE3$_i$/E3$_i$(t0) is calculated from the following equation:

$$\Delta E3_o/E3_o(t0):\Delta E3_i/E3_i(t0)=1:T3.$$

Then, the ratio T3 thus calculated is compared with a predetermined threshold T3th (step ST1120) and, when the ratio T3 is larger than the threshold T3th, an absolute value |ΔE3$_i$| of ΔE3$_i$ is further compared with a predetermined threshold ΔE3$_i$th (step ST1130). When the result of the comparison is that the absolute value |ΔE3$_i$| is larger than the predetermined threshold ΔE3$_i$th, the detection controller 680 determines that there is a circuit anomaly in the reflected signal light detection circuit 600 due to the increase in dark current in the PD in the light receiving unit 620, and performs an alarm process (step ST1140). On the other hand, when it is determined in either of step ST1120 and step ST1130 that the ratio T3 or the absolute value |ΔE3$_i$| is not more than the threshold, the alarm process of step ST1140 is not carried out. In the alarm process of step ST1140, the detection controller 680 notifies the amplification controller 250 of the alarm signal 600B. Thereafter, the notification operation of the alarm signal 600B is forcibly terminated in the reflected signal light detection circuit 600. When the notification of the alarm signal 600B to the amplification controller 250 is released after the detection of the circuit anomaly in the reflected signal light detection circuit 600 from the temporal variation of the high frequency components of the reflected signal light in this way, it becomes feasible to avoid the shutdown of the optical amplifier 1A.

On the other hand, the second detection process in FIG. 11B is different in the determination operation from the above-described first detection process. Specifically, in this second detection process, a value calculated at an arbitrary point (step ST1160), of the ratio T3 obtained by the determination value calculation operation in step ST1110 is set as an initial value T30 (step ST1170). In the example of FIG. 11B, the ratio T3 obtained by the first calculation operation is set as the initial value T30. The ratio T3 calculated after the setting of the initial value T30 is compared with the threshold T3th (step ST1120) and, when the ratio T3 is larger than the predetermined threshold T3th, the absolute value |ΔE3$_i$| of ΔE3$_i$ is further compared with the predetermined threshold ΔE3$_i$th (step ST1130). When the result of the comparison is that the absolute value |ΔE3$_i$| is larger than the threshold ΔE3$_i$th, the detection controller 680 determines that there is a circuit anomaly in the reflected signal light detection circuit 600 due to the increase in dark current in the PD in the light receiving unit 620, and caries out a true value calculation (step ST1180). In this step ST1180, a true value E3$_r$(t) of the voltage to be outputted from the signal component detection unit 640 is calculated by subtracting a voltage of a noise component calculated based on the ratio T3 and initial value T30, from E3$_o$(t). In the alarm process of step ST1140, the amplification controller 250 is notified of the alarm signal 600B. In this alarm process, the amplification controller 250 may be notified of the calculated true value E3$_r$(t).

According to the embodiment of the invention, the light detection circuit to monitor the signal light as an amplification object is configured so that the detection controller determines whether there is a circuit anomaly due to an increase of dark current in the photoelectric conversion element included in the light receiving unit, based on the difference between the temporal change amounts of the respective voltage components of the signal component of the voltage of output signal from the light receiving unit and the signal component in the high frequency region included in the signal component. Since the amplification controller can perform the suitable switching of the drive current control to the e pumping light source, based on the result of this determination, the optical amplification operation equivalent to the normal operation can be carried on even with an increase of dark current in the photoelectric conversion element included in the light receiving unit of the light detection circuit.

From the above description of the present invention, it will be obvious that the present invention may be varied in many ways. Such variations are not to be regarded as a departure from the spirit and scope of the present invention, and all improvements as would be obvious to those skilled in the art are intended for inclusion within the scope of the following claims.

What is claimed is:

1. An optical amplifier comprising:
   an input terminal where signal light enters;
   an output terminal where the signal light is outputted;
   a transmission line which is arranged between the input terminal and the output terminal and on which the signal light propagates;
   an optical amplification device arranged on the transmission line and having an amplification transmission medium for amplifying the signal light and a pumping light source for supplying pumping light to the amplification transmission medium;
   an amplification controller for controlling at least the pumping light source; and
   a light detection circuit arranged in at least either one of a section on the transmission line between the input terminal and the optical amplification device and a section on the transmission line between the optical amplification device and the output terminal,
   wherein the light detection circuit has:
   a light splitting unit for extracting a partial light of the signal light as split light from the transmission line;
   a light receiving unit including a photoelectric conversion element and adapted for outputting a voltage signal according to a light quantity of the split light received by the photoelectric conversion element;
   an extraction unit for extracting a voltage component in a high frequency region included in a voltage component of the signal light, from the voltage of output signal from the light receiving unit;
   a signal component detection unit for detecting the voltage of output signal from the light receiving unit;
   a high frequency component detection unit for detecting a voltage of output signal from the extraction unit; and a detection controller for detecting, at least, whether there is an increase of dark current in the photoelectric conversion element included in the light receiving unit, based on respective detection results by the signal component detection unit and by the high frequency component detection unit.

2. The optical amplifier according to claim 1,
wherein the light detection circuit includes a first light detection circuit having a first light splitting element functioning as the light splitting unit, a first light receiving element functioning as the light receiving unit, a first extraction element functioning as the extraction unit, a first signal component detection element functioning as the signal component detection unit, a first high frequency component detection element functioning as the high frequency component detection unit, and a first detection control element functioning as the detection controller,
wherein the first light splitting element is arranged in the section on the transmission line between the optical amplification device and the output terminal and extracts a partial light of amplified signal light output voltage from the optical amplification device toward the output terminal, as a split light component from the transmission line,
wherein when a voltage of output signal from the first signal component detection element is defined as $E1_o(t)$, a voltage of output signal from the first high frequency component detection element as $E1_i(t)$, a temporal change of the $E1_o(t)$ from a time t0 to a time t1 as $\Delta E1_o(=E1_o(t0)-E1_o(t1))$, and a temporal change of the $E1_i(t)$ from the time t0 to the time t1 as $\Delta E1_i(=E1_i(t0)-E1_i(t1))$, the first detection control element calculates a ratio T1 of $\Delta E1_0/E1_o(t0)$ and $\Delta E1_i/E1_i(t0)$ from an equation of:

$$\Delta E1_o/E1_o(t0):\Delta E1_i/E1_i(t0)=1:T1,$$

and determines that there is a circuit anomaly in the first light detection circuit, due to the increase in dark current in the photoelectric conversion element included in the first light receiving element, on the condition that the ratio T1 calculated is larger than a predetermined threshold T1th and an absolute value of $\Delta E1_i$ is larger than a predetermined threshold $\Delta E1_i$th.

3. The optical amplifier according to claim 2,
wherein the first detection control element of the first light detection circuit notifies the amplification controller of an alarm signal indicating the circuit anomaly in the first light detection circuit, and
wherein, after receiving the alarm signal from the first light detection circuit, the amplification controller switches a control method of a drive current to the pumping light source from a constant light output keeping control or a constant gain keeping control to a constant drive current keeping control of the drive current to the pumping light source.

4. The optical amplifier according to claim 1,
wherein the light detection circuit includes a second light detection circuit having a second light splitting element functioning as the light splitting unit, a second light receiving element functioning as the light receiving unit, a second extraction element functioning as the extraction unit, a second signal component detection element functioning as the signal component detection unit, a second high frequency component detection element functioning as the high frequency component detection unit, and a second detection control element functioning as the detection controller,
wherein the second light splitting element is arranged in the section on the transmission line between the input terminal and the optical amplification device and extracts a partial light of input signal light propagating from the input terminal toward the optical amplification device, as a split light component from the transmission line,
wherein when a voltage of output signal from the second signal component detection element is defined as $E2_o(t)$, a voltage of output signal from the second high frequency component detection element as $E2_i(t)$, a temporal change of the $E2_o(t)$ from a time t0 to a time t1 as $\Delta E2_o(=E2_o(t0)-E2_o(t1))$, and a temporal change of the $E2_i(t)$ from the time t0 to the time t1 as $\Delta E2_i(=E2_i(t0)-E2_i(t1))$, the second detection control element calculates a ratio T2 of $\Delta E2_o/E2_o(t0)$ and $\Delta E2_i/E2_i(t0)$ from an equation of:

$$\Delta E2_o/E2_o(t0):\Delta E2_i/E2_i(t0)=1:T2,$$

and determines that there is a circuit anomaly in the second light detection circuit, due to the increase in dark current in the photoelectric conversion element included in the second light receiving element, on the condition that the ratio T2 calculated is larger than a predetermined threshold T2th and an absolute value of $\Delta E2_i$ is larger than a predetermined threshold $\Delta E2_i$th.

5. The optical amplifier according to claim 1,
wherein the light detection circuit includes a third light detection circuit having a third light splitting element functioning as the light splitting unit, a third light receiving element functioning as the light receiving unit, a third extraction element functioning as the extraction unit, a third signal component detection element functioning as the signal component detection unit, a third high frequency component detection element functioning as the high frequency component detection unit, and a third detection control element functioning as the detection controller,
wherein the third light splitting element is arranged in the section on the transmission line between the optical amplification device and the output terminal and extracts a partial light of reflected signal light propagating from the output terminal toward the optical amplification device, as a split light component from the transmission line,
wherein when a voltage of output signal from the third signal component detection element is defined as $E3_o(t)$, a voltage of output signal from the third high frequency component detection element as $E3_i(t)$, a temporal change of the $E3_o(t)$ from a time t0 to a time t1 as $\Delta E3_o(=E3_o(t0)-E3_o(t1))$, and a temporal change of the $E3_i(t)$ from the time t0 to the time t1 as $\Delta E3_i(=E3_i(t0)-E3_i(t1))$, the third detection control element calculates a ratio T3 of $\Delta E3_o/E3_o(t0)$ and $\Delta E3_i/E3_i(t0)$ from an equation of:

$$\Delta E3_o/E3_o(t0):\Delta E3_i/E3_i(t0)=1:T3,$$

and determines that there is a circuit anomaly in the third light detection circuit, due to the increase in dark current in the photoelectric conversion element included in the third light receiving element, on the condition that the ratio T3 calculated is larger than a predetermined threshold T3th and an absolute value of $\Delta E3_i$ is larger than a predetermined threshold $\Delta E3_i$th.

6. The optical amplifier according to claim 5,
wherein the third detection control element of the third light detection circuit notifies the amplification controller of an alarm signal indicating the circuit anomaly in the third light detection circuit, and thereafter forcibly terminates a notification operation of the alarm signal.

7. The optical amplifier according to claim 1,
wherein the light detection circuit includes a first light detection circuit having a first light splitting element functioning as the light splitting unit, a first light receiving element functioning as the light receiving unit, a first extraction element functioning as the extraction unit, a first signal component detection element functioning as the signal component detection unit, a first high frequency component detection element functioning as the high frequency component detection unit, and a first detection control element functioning as the detection controller,
wherein the first light splitting element is arranged in the section on the transmission line between the optical amplification device and the output terminal and extracts a partial light of amplified signal light outputted from the optical amplification device toward the output terminal, as a split light component from the transmission line,
wherein when a voltage of output signal from the first signal component detection element is defined as $E1_o(t)$, a voltage of output signal from the first high frequency component detection element as $E1_i(t)$, a temporal change of the $E1_o(t)$ from a time t0 to a time t1 as $\Delta E1_o(=E1_o(t0)-E1_o(t1))$, and a temporal change of the $E1_i(t)$ from the time t0 to the time t1 as $\Delta E1_i(=E1_i(t0)-E1_i(t1))$, the first detection control element, while setting a value calculated at an arbitrary point, of a ratio T1 of $\Delta E1_o/E1_o(t0)$ and $\Delta E1_i/E1_i(t0)$ represented by an equation of:

$$\Delta E1_o/E1_o(t0):\Delta E1_i/E1_i(t0)=1:T1,$$

as an initial value T10, determines that there is a circuit anomaly in the first light detection circuit, due to the increase in dark current in the photoelectric conversion element included in the first light receiving element, on the condition that the ratio T1 calculated after the setting of the initial value T10 is larger than a predetermined threshold T1th and an absolute value of $\Delta E1_i$ is larger than a predetermined threshold $\Delta E1_i$th, and calculates a true value $E1_r(t)$ of a voltage to be outputted from the first signal component detection element, by subtracting a voltage of a noise component calculated based on the ratio T1 and the initial value T10, from the $E1_o(t)$.

8. The optical amplifier according to claim 1,
wherein the light detection circuit includes a second light detection circuit having a second light splitting element functioning as the light splitting unit, a second light receiving element functioning as the light receiving unit, a second extraction element functioning as the extraction unit, a second signal component detection element functioning as the signal component detection unit, a second high frequency component detection element functioning as the high frequency component detection unit, and a second detection control element functioning as the detection controller,
wherein the second light splitting element is arranged in the section on the transmission line between the input terminal and the optical amplification device and extracts a partial light of input signal light propagating from the input terminal toward the optical amplification device, as a split light component from the transmission line,
wherein when a voltage of output signal from the second signal component detection element is defined as $E2_o(t)$, a voltage of output signal from the second high frequency component detection element as $E2_i(t)$, a temporal change of the $E2_o(t)$ from a time t0 to a time t1 as $\Delta E2_o(=E2_o(t0)-E2_o(t1))$, and a temporal change of the $E2_i(t)$ from the time t0 to the time t1 as $\Delta E2_i(=E2_i(t0)-E2_i(t1))$, the second detection control element, while setting a value calculated at an arbitrary point, of a ratio T2 of $\Delta E2_o/E2_o(t0)$ and $\Delta E2_i/E2_i(t0)$ represented by an equation of:

$$\Delta E2_o/E2_o(t0):\Delta E2_i/E2_i(t0)=1:T2,$$

as an initial value T20, determines that there is a circuit anomaly in the second light detection circuit, due to the increase in dark current in the photoelectric conversion element included in the second light receiving element, on the condition that the ratio T2 calculated after the setting of the initial value T20 is larger than a predetermined threshold T2th and an absolute value of $\Delta E2_i$ is larger than a predetermined threshold $\Delta E2_i$th, and calculates a true value $E2_r(t)$ of a voltage to be outputted from the second signal component detection element, by subtracting a voltage of a noise component calculated based on the ratio T2 and the initial value T20, from the $E2_o(t)$.

9. The optical amplifier according to claim 1,
wherein the light detection circuit includes a third light detection circuit having a third light splitting element functioning as the light splitting unit, a third light receiving element functioning as the light receiving unit, a third extraction element functioning as the extraction unit, a third signal component detection element functioning as the signal component detection unit, a third high frequency component detection element functioning as the high frequency component detection unit, and a third detection control element functioning as the detection controller,
wherein the third light splitting element is arranged in the section on the transmission line between the optical amplification device and the output terminal and extracts a partial light of reflected signal light propagating from the output terminal toward the optical amplification device, as a split light component from the transmission line,
wherein when a voltage of output signal from the third signal component detection element is defined as $E3_o(t)$, a voltage outputted from the third high frequency component detection element as $E3_i(t)$, a temporal change of the $E3_o(t)$ from a time t0 to a time t1 as $\Delta E3_o(=E3_o(t0)-E3_o(t1))$, and a temporal change of the $E3_i(t)$ from the time t0 to the time t1 as $\Delta E3_i(=E3_i(t0)-E3_i(t1))$, the third detection control element, while setting a value calculated at an arbitrary point, of a ratio T3 of $\Delta E3_o/E3_o(t0)$ and $\Delta E3_i/E3_i(t0)$ represented by an equation of:

$$\Delta E3_o/E3_o(t0):\Delta E3_i/E3_i(t0)=1:T3,$$

as an initial value T30, determines that there is a circuit anomaly in the third light detection circuit, due to the increase in dark current in the photoelectric conversion element included in the third light receiving element, on the condition that the ratio T3 calculated after the setting of the initial value T30 is larger than a predetermined threshold T3th and an absolute value of $\Delta E3_i$ is larger than a predetermined threshold $\Delta E3_i$th, and calculates a true value $E3_r(t)$ of a voltage to be outputted from the third signal component detection element, by subtracting a voltage of a noise component calculated based on the ratio T3 and the initial value T30, from the $E3_o(t)$.

\* \* \* \* \*